United States Patent
Ota et al.

(10) Patent No.: US 10,719,068 B2
(45) Date of Patent: Jul. 21, 2020

(54) SYSTEM AND METHOD FOR MANAGING DEVICES BY ASSOCIATION BETWEEN CONTROL LOOP AND PLANT ASSET VALUE

(71) Applicant: Yokogawa Electric Corporation, Musashino-shi, Tokyo (JP)

(72) Inventors: Hirokazu Ota, Singapore (SG); Xuenian Hu, Singapore (SG); Zhong Shen, Singapore (SG); Hiroshi Shimizu, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 119 days.

(21) Appl. No.: 15/702,846

(22) Filed: Sep. 13, 2017

(65) Prior Publication Data
US 2019/0079498 A1    Mar. 14, 2019

(51) Int. Cl.
*G05B 19/418*    (2006.01)

(52) U.S. Cl.
CPC .............. *G05B 19/4188* (2013.01); *G05B 2219/31098* (2013.01); *G05B 2219/31131* (2013.01)

(58) Field of Classification Search
None
See application file for complete search history.

(56) References Cited

U.S. PATENT DOCUMENTS

| 2002/0077711 | A1* | 6/2002 | Nixon | C10G 11/187 |
| | | | | 700/51 |
| 2007/0079250 | A1* | 4/2007 | Bump | G05B 23/0216 |
| | | | | 715/762 |

* cited by examiner

*Primary Examiner* — Mohammad Ali
*Assistant Examiner* — Saad M Kabir
(74) *Attorney, Agent, or Firm* — Sughrue Mion, PLLC (57) ABSTRACT

A plant asset management system and method for managing field devices in a plant are implemented by association between control loop and plant asset value. One or more control loop configurations are extracted from one or more control system definitions of a process control system. One or more device configurations are extracted from one or more device management system definitions of a device management system. There is automatically determined whether one or more control loops and one or more devices are respectively associated with each other, based on the one or more loop configurations and the one or more device configurations.

11 Claims, 6 Drawing Sheets

SYSTEM AND METHOD FOR MANAGING DEVICES BY ASSOCIATION BETWEEN CONTROL LOOP AND PLANT ASSET VALUE

TECHNICAL FIELD

Embodiments of the present invention generally relate to a system and a method for managing field devices by association between control loop plant asset values.

BACKGROUND ART

In general, an industrial plant management system is designed to manage a plurality of devices such as a plurality of plant devices, in other words, field devices such as valves, pressure sensors, and temperature sensors in a plant. The management system may include, but is not limited to, a device management system is designed to provide for a centralized management of large amounts of data from plant monitoring and control devices and manufacturing equipment. The device management system is used together with one or more process control systems such as distributed control systems (DCSs) that are designed to control the plurality of field devices through one or more network systems including field control systems (FCS) in the plant. An industrial plant management system for controlling and managing the plurality of field devices may include, but is not limited to, the control system for controlling the plurality of field devices, and the management system configured in cooperation with the control system.

For managing plant asset value, the industrial plant management system may, in some cases, need an additional manager as a plant asset value manager. The plant asset value manager is designed to increase or maximize plant asset value. The plant asset value manager may, in some cases, monitor all plant devices or field devices through the process control system such as distributed control systems (DCSs) and the device management system. The plant asset value manager is configured to manage field device configurations from the device management system. The plant asset value manager is also configured to perform diagnostic functions and to manage performance of one or more control loops as control units based on control loop configurations from the process control system such as distributed control systems (DCSs). Each control loop or unit includes a respective field control system (FCS) and a connected group of field devices which are subject to the controls by the field control system (FCS).

In the control process, the following facets have to be investigated. The control loop components that are responsible for this performance loss has to be investigated and determined. The impact of valve performance loss and other device performance loss on the relevant loops also has to be investigated and determined. The existing system performs the above process as implementation as to determine how the loops and their constituent valves and other devices are configured. The definitions, for example, engineering data of the control systems such as the distributed control system (DCS) and the process control system (PCS) and the management system are manually examined with time consuming. This manual examination process includes a time-consuming process for manually identifying the relationship between the control loops and the connected valves and other field devices.

Figure 1A:
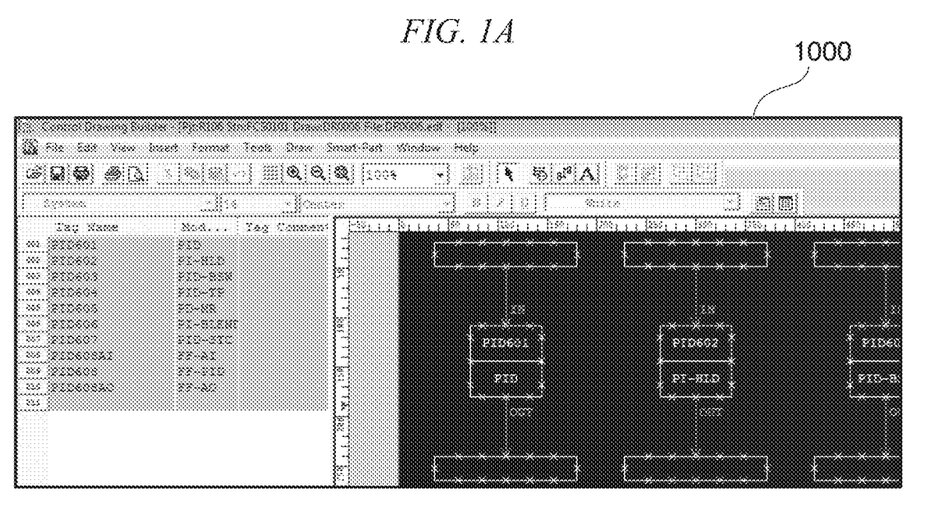
FIG. 1A is an exemplified display image on a display device screen which shows two control loops and several control valves.

FIG. 1A is an exemplified display image on a display device screen which shows two control loops and plural control valves. The following descriptions with reference to this exemplified display image are illustrative purpose for briefly understanding one example, but not all, of the manual examination process. For example, in the first process, to determine which device is associated with one control loop in the distributed control system (DCS), it is necessary to check DCS Control Drawing Builder and FieldBus builder to find the device tag involved. In the second process, it is necessary to check the device management system to find the devices above. In the third, final process, it is necessary to manually link or associate each control loop and a respective group of one or more filed devices which are subject to the control loop. To determine how the loop and field devices operate with respect to each other at any instant in time, the industrial plant system is used to manually select and view the followings: the values indicating performance loss for each relevant loop-device tag (diagnostic results "KPI"); and the raw data trends.

Figure 1B:
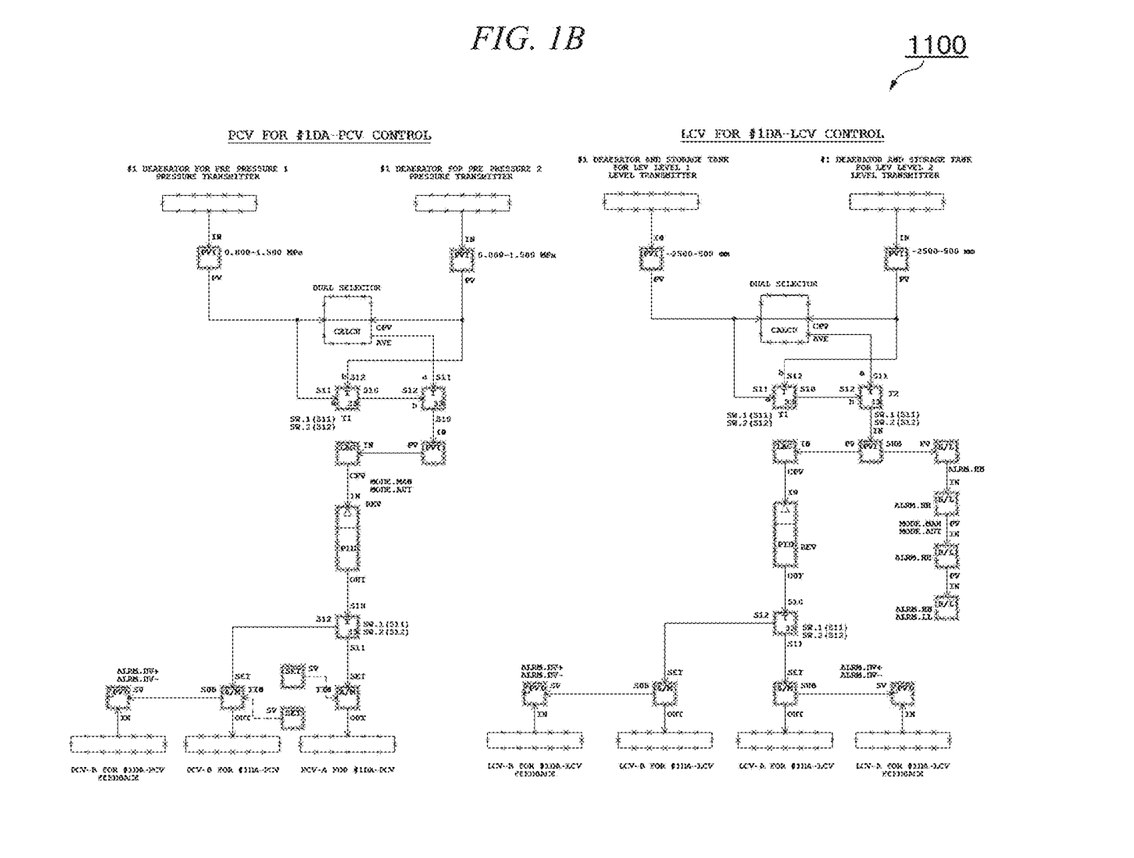
FIG. 1B is an exemplified display image on a display device screen which shows two control loops that are complex loops with multiple inputs and multiple outputs.

FIG. 1B is an exemplified display image on a display device screen which shows two control loops that are complex loops with multiple inputs and multiple outputs. The first control loop in left is for the pressure transmitter, and the second control loop in right is for the level transmitter. The first and second control loops are substantially similar to each other in mechanisms and logic. For avoiding duplicate descriptions, the descriptions will be made hereafter for the first control loop in left.

i) Two transmitter input, Transmitter 1 and Transmitter 2 (which are shown as two blocks at the top of the left figure), they will give input to Dual Selector (represented in another block below);

ii) In Dual Selector, it performs selection of selecting among transmitter 1, OR transmitter 2, OR an average of transmitter 1 and 2;

iii) 4 small blocks ("T", "T", "LAG" and "PVI"), shown below the Dual Selector, are selectors, which are also used to complete the above selection;

iv) The selected input finally will be transmitted to PID controller (represented as "PID" block in the figure), and the controller will control PCV-B for #1DA or PCV-A for # IDA (devices), (they are also represented as blocks and in the bottom of the figure);

v) The blocks between PID controller and devices (PCV-B for # IDA or PCV-A for #1DA), are selectors, which will be chosen based on the output of the dual selector.

vi) The far left block is "Alarm", which is used to check the feedback and control output.

Figure 2:
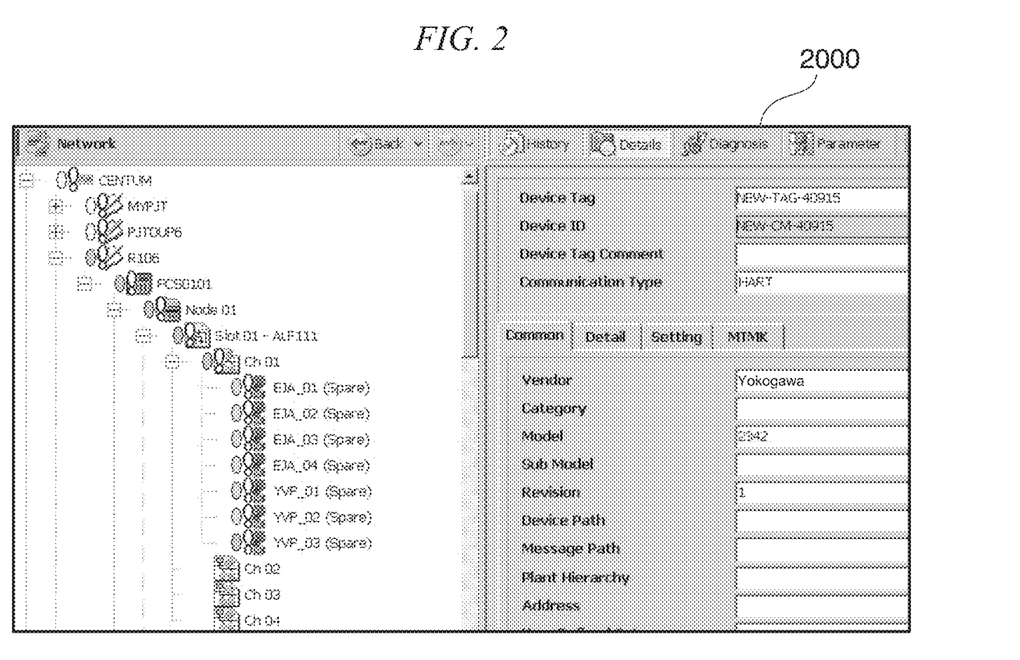
FIG. 2 is an exemplified display image on a display device screen which shows one example of the process for identifying the relationship between the control loops and the connected field devices.

FIG. 2 is an exemplified display image on a display device screen which shows one example of the process for identifying the relationship between the control loops and the connected field devices. With the existing implementation, the procedure is manual and time-consuming to identify the relationship between the control loops and the connected field devices.

SUMMARY

In some aspects, a computer-implemented plant asset management method is provided. The method may include, but is not limited to, extracting one or more control loop configurations from one or more control system definitions of a process control system; extracting one or more device configurations from one or more device management system definitions of a device management system; and automatically establishing an association between each control loop and an associated group of one or more devices, on the basis at least in part of the one or more control loop configurations from the process control system and the one or more device configurations from the device management system.

In other aspects, a computer program product for a plant asset management system is provided. The computer program product may include, but is not limited to, a computer software embodied on a non-transitory computer readable storage medium. The computer software may include, but is not limited to, computer-executable instructions, when executed by one or more computers, to cause the one or more computers: extract one or more control loop configurations from one or more control system definitions of a process control system; extract one or more device configurations from one or more device management system definitions of a device management system; and automatically establish an association between each control loop and an associated group of one or more devices, on the basis at least in part of the one or more control loop configurations from the process control system and the one or more device configurations from the device management system.

In still other aspects, a plant asset management system in a plant is provided. The plant asset management system may include, but is not limited to, a plurality of field control systems, a process control system, a device management system, and a loop-device auto-association system. Each of the plurality of field control systems is configured to communicate with a respective group of one or more field devices through a respective field network. Each of the plurality of field control systems is configured to control the respective group of one or more field devices. The process control system is configured to communicate with the plurality of field control systems through a control network. The process control system is configured to control each control loop which may include, but is not limited to, a respective one of the plurality of field control systems and a respectively connected group of one or more field devices. The device management system is configured to communicate with the plurality of field control systems through the control network. The device management system is configured to manage device parameters and/or the device data of each of the plurality of field control systems. The loop-device auto-association system is configured to communicate with the process control system and the device management system. The loop-device auto-association system is configured to at least: extract one or more control loop configurations from one or more control system definitions of the process control system; extract one or more device configurations from one or more device management system definitions of the device management system; and automatically establish an association between each control loop and an associated group of one or more devices, on the basis at least in part of the one or more control loop configurations from the process control system and the one or more device configurations from the device management system.

DESCRIPTIONS

In some aspects, a computer-implemented plant asset management method is provided. The method may include, but is not limited to, extracting one or more control loop configurations from one or more control system definitions of a device process system; extracting one or more device configurations from one or more device management system definitions of a device management system; and automatically establishing an association between each control loop and an associated group of one or more devices, on the basis at least in part of the one or more control loop configurations from the process control system and the one or more device configurations from the device management system.

In some cases, each control loop may include, but is not limited to, a respective field control system, which is subject to control by the process control system; and an associated group of one or more field devices, which are subject to controls by the respective field control system.

In some cases, the method may further include, but is not limited to, automatically retrieving data that form the basis of the one or more control loop configurations from the process control system; and automatically retrieving data that form the basis of the one or more device configurations from the device management system.

In some cases, the method may further include, but is not limited to, automatically generating a loop-device association information on the basis at least in part of the association between each control loop and the associated group of one or more field devices.

In some cases, the loop-device association information may further include, but is not limited to, the association between each control loop, which is subject to control by the process control system, and the associated group of one or more field devices; and at least one of device parameters and device data of the associated group of one or more field devices, the device parameters and the device data being subject to management by the device management system.

In some cases, the method may further include, but is not limited to, automatically supplying the loop-device association information to an asset management system, wherein the process control system and the device management system are subject to management by the asset management system.

In some cases, the method may further include, but is not limited to, automatically generating, from the loop-device association information, a hierarchy tree that includes a plurality of control loops controlled by the process control system, wherein each of the plurality of control loops includes a respective field control system, which is subject to control by the process control system, and an associated group of one or more field devices, which are subject to the controls by the respective field control system, and displaying the hierarchy tree on a display screen of the asset management system.

In other aspects, a computer program product for a plant asset management system is provided. The computer program product may include, but is not limited to, a computer software embodied on a non-transitory computer readable storage medium. The computer software may include, but is not limited to, computer-executable instructions, when executed by one or more computers, to cause the one or more computers: extract one or more control loop configurations from one or more control system definitions of a process control system; extract one or more device configurations from one or more device management system definitions of a device management system; and automatically establish an association between each control loop and an associated group of one or more devices, on the basis at least in part of the one or more control loop configurations from the process control system and the one or more device configurations from the device management system.

In some cases, each control loop may include, but is not limited to, a respective field control system, which is subject to control by the process control system; and an associated group of one or more field devices, which are subject to controls by the respective field control system.

In some cases, the computer software may include, but is not limited to, further computer-executable instructions, when executed by the one or more computers, to cause the one or more computers: automatically retrieve data that form the basis of the one or more control loop configurations from the process control system; and automatically retrieve data that form the basis of the one or more device configurations from the device management system.

In some cases, the computer software may include, but is not limited to, further computer-executable instructions, when executed by the one or more computers, to cause the one or more computers: automatically generate a loop-device association information on the basis at least in part of the association between each control loop and the associated group of one or more field devices.

In some cases, the loop-device association information may include, but is not limited to: the association between each control loop, which is subject to control by the process control system, and the associated group of one or more field devices; and at least one of device parameters and device data of the associated group of one or more field devices, the device parameters and the device data being subject to management by the device management system.

In some cases, the computer software may include, but is not limited to, further computer-executable instructions, when executed by the one or more computers, to cause the one or more computers: automatically supply the loop-device association information to an asset management system; and wherein the process control system and the device management system are subject to management by the asset management system.

In some cases, the computer software may include, but is not limited to, further computer-executable instructions, when executed by the one or more computers, to cause the one or more computers: automatically generating, from the loop-device association information, a hierarchy tree that includes a plurality of control loops controlled by the process control system, wherein each of the plurality of control loops includes a respective field control system, which is subject to control by the process control system, and an associated group of one or more field devices, which are subject to the controls by the respective field control system; and displaying the hierarchy tree on a display screen of the asset management system.

In still other aspects, a plant asset management system in a plant is provided. The plant asset management system may include, but is not limited to, a plurality of field control systems, a process control system, a device management system, and a loop-device auto-association system. Each of the plurality of field control systems is configured to communicate with a respective group of one or more field devices through a respective field network. Each of the plurality of field control systems is configured to control the respective group of one or more field devices. The process control system is configured to communicate with the plurality of field control systems through a control network. The process control system is configured to control each control loop which may include, but is not limited to, a respective one of the plurality of field control systems and a respectively connected group of one or more field devices. The device management system is configured to communicate with the plurality of field control systems through the control network. The device management system is configured to manage device parameters and/or the device data of each of the plurality of field control systems. The loop-device auto-association system is configured to communicate with the process control system and the device management system. The loop-device auto-association system is configured to at least: extract one or more control loop configurations from one or more control system definitions of the process control system; extract one or more device configurations from one or more device management system definitions of the device management system; and automatically establish an association between each control loop and an associated group of one or more devices, on the basis at least in part of the one or more control loop configurations from the process control system and the one or more device configurations from the device management system.

In some cases, each control loop may include, but is not limited to, a respective field control system, which is subject to control by the process control system, and an associated group of one or more field devices, which are subject to controls by the respective field control system.

In some cases, the loop-device auto-association system is further configured to at least: automatically retrieve data that form the basis of the one or more control loop configurations from the process control system: and automatically retrieve data that form the basis of the one or more device configurations from the device management system.

In some cases, the loop-device auto-association system is further configured to at least: automatically generate a loop-device association information on the basis at least in part of the association between each control loop and the associated group of one or more field devices.

In some cases, the loop-device association information may include, but is not limited to, the association between each control loop, which is subject to control by the process control system, and the associated group of one or more field devices; and at least one of device parameters and device data of the associated group of one or more field devices, the device parameters and the device data being subject to management by the device management system.

In some cases, the plant asset management system may further include, but is not limited to, an asset management system configured to communicate with the loop-device auto-association system, the process control system and the device management system, the asset management system configured to indirectly manage the process control system and the device management system, wherein the loop-device auto-association system is further configured to at least: automatically supply the loop-device association information to the asset management system.

In some cases, the loop-device auto-association system is further configured to at least: automatically generating, from the loop-device association information, a hierarchy tree that includes a plurality of control loops controlled by the process control system, wherein each of the plurality of control loops includes a respective field control system, which is subject to control by the process control system, and an associated group of one or more field devices, which are subject to the controls by the respective field control system. The asset management system is configured to display the hierarchy tree.

Embodiments

Figure 3:
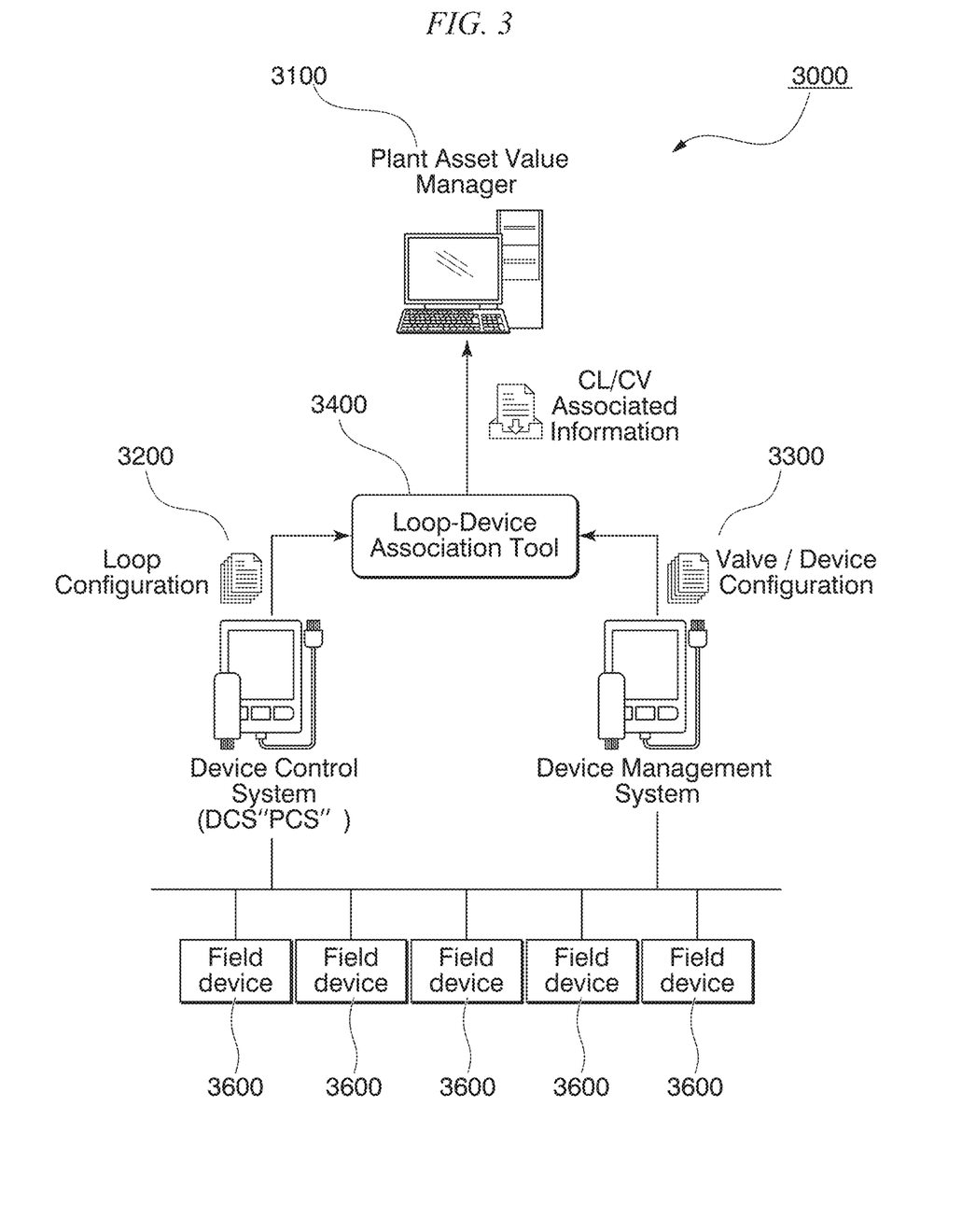
FIG. 3 is a schematic diagram showing an industrial plant system in some embodiments.

FIG. 3 is a schematic diagram showing an industrial plant system in some embodiments. An industrial plant system 3000 may include, but is not limited to, a plant asset value manager 3100, a process control system 3200, a device management system 3300, a loop-device auto-association tool 3400, a network system 3500, and a plurality of field devices 3600. The loop-device auto-association tool 3400 is not only mere association tool for associating loops and devices from loop configurations and device configurations but also is integral in the industrial plant system for increasing or maximizing the plant asset value. The loop-device auto-association tool 3400 is applicable to a variety of specific configurations of the industrial plant systems. For better understanding the loop-device auto-association tool 3400, other elements and configurations in the industrial plant system will be described below.

The plurality of field devices 3600 may refer to any wirelessly or wired communicative physical hardware devices that are configured to wirelessly or wiredly communicate with other devices. Typical examples of the plurality of field devices 3600 may include, but are not limited to, valves, pressure sensors, and temperature sensors installed in an industrial plant.

The network system 3500 may refer to any wirelessly or wiredly communicative network resources that are configured to provide controls to the plurality of field devices 3600 and wireless or wired network connections among the process control system 3200, the device management system 3300, and the plurality of field devices 3600. The network system 3500 may include, but is not limited to, one or more field control systems (FCS), a control network (CN), and a field network (FN). The control network (CN) is configured to provide connections among the one or more field control systems (FCS), the process control system 3200, and the device management system 3300 for allowing communication among the one or more field control systems (FCS), the process control system 3200, and the device management system 3300. The field network (FN) is configured to provide connections among the one or more field control systems (FCS) and the plurality of field devices 3600 for allowing communication among the one or more field control systems (FCS) and the plurality of field devices 3600 in one or more communication ways. Each of the plurality of field devices is configured to be communicative to the field control system (FCS) through the field network (FN) to send field device data such as measured value data to the field control system (FCS). In one control loop subject to the control by the process control system 3200, the field control system (FCS) is commutatively connected to one or more field devices 3600 through the field network (FN) in any available communication way for controlling the one or more field devices 3600. In another control loop subject to the control by the process control system 3200, the other field control system (FCS) is also commutatively connected to other field devices 3600 through the field network (FN) in any available communication way for controlling the other field devices 3600.

The process control system 3200 may refer to any physically tangible control system including software components configured to control, in each control loop, a respective field control system (FCS) and the one or more field devices 3600 which are subject to the control by the respective field control system (FCS). The process control system 3200 is configured to communicate through the control network (CN), the field control systems (FCSs) and the field network (FN) to the plurality of field devices 3600 installed in the plant for controlling the plurality of field devices 3600. The process control system 3200 has one or more control loops. The process control system 3200 is configured to control, in each control loop, a respective field control system (FCS) and the one or more field devices 3600 which are subject to the control by the respective field control system (FCS). The process control system 3200 is configured to configure and control each of the control loops. Each control loop is configurable, so as to configure each association of a respective field control system (FCS) and the associated one or more field devices 3600 which are subject to the control by the respective field control system (FCS) The process control system 3200 has control loop configuration for control loops, wherein each control loop represents an association or a link of the field control system (FCS) and the one or more field devices 3600 which are subject to the control by the respective field control system (FCS).

The device management system 3300 may refer to any physically tangible management system including software components configured to indirectly manage the plurality of field devices 3600, for example, to configure, set, and change one or more device parameters of each field device 3600 installed in the plant and to manage device data of the field device 3600. The device management system 3300 is configured to communicate through the control network (CN), the field control systems (FCSs) and the field network (FN) to the plurality of field devices 3600 installed in the plant for managing the plurality of field devices 3600. For the device management system 3300 managing the plurality of field devices 3600, the device management system 3300 may be configured to configure, set, and change one or more device parameters of each field device 3600 installed in the plant and to manage device data of the field device 3600. The device management system 3300 may be configured to allow operator or maintenance person to monitor the condition of plant assets. The device management system 3300 is configured to be in cooperation with the process control system 3200. For the cooperation between the device management system 3300 and the process control system 3200, the management by the device management system 3300 needs to be cooperated with the loop control of the process control system 3200. The cooperation between the management by the device management system 3300 and the loop control of the process control system 3200 needs to identify a relationship between each control loop, which is controlled by the process control system 3200, and device parameters and/or device data, which are managed by the device management system 3300, of the field devices 3600.

The plant asset value manager 3100 may refer to any physically tangible hardware system including software components configured to assist or support asset manager to increase or maximize plant asset values. The plant asset value manager 3100 has a user interface function. The plant asset value manager 3100 is cooperative with the loop-device auto-association tool 3400.

The loop-device auto-association tool 3400 may refer to an auto-association tool, which is implemented by one or more software components and integrated and/or embodied in a physically tangible hardware system which may be the common to or different from the physically tangible hardware system of the plant asset value manager 3100. The loop-device auto-association tool 3400 as the auto-association tool is configured to automatically establish an association between each control loop and one or more associated field devices on the basis at least in part of one or more control loop configurations from the process control system 3200 and one or more device configurations from the device management system 3300. The loop-device auto-association tool 3400 is used for implementing the automation of the process for establishing the association between each control loop and the one or more associated field devices. Each control loop includes a respective field control system under control by the process control system 3200 and a connected group of one or more field devices which are subject to control by the respective field control system. Each control loop or unit includes a respective field control system (FCS) and an associated group of field devices which are subject to the controls by the field control system (FCS).

For automatically establishing the association between each control loop and one or more associated field devices, the loop-device auto-association tool 3400 may be, in some cases, but is not limited to be, configured as follows.

The loop-device auto-association tool 3400 is configured to automatically extract one or more control loop configurations from the process control system 3200 and to automatically extract one or more device configurations from the device management system 3300. For implementing this automatic extraction process, the loop-device auto-association tool 3400 is configured to automatically retrieve data that form the basis of the control loop configuration information from the process control system 3200 and automatically retrieve data that form the basis of the device configuration information from the device management system 3300. The loop-device auto-association tool 3400 is configured to automatically establish an association between the each control loop and one or more associated field devices on the basis at least in part of the extracted one or more control loop configurations and the extracted one or more device configurations from the device management system 3300.

The loop-device auto-association tool 3400 is configured to automatically generate one or more loop-device association information on the basis at least in part of the automatically established association between the each control loop and one or more associated field devices. The generated one or more loop-device association information includes the association between the each control loop controlled by the process control system 3200 and the one or more associated field devices. The generated one or more loop-device association information may also include device parameters and/or device data of the one or more associated field devices managed by the device management system 3300. The loop-device auto-association tool 3400 is configured to automatically generate, from the loop-device association information, a hierarchy tree that includes a plurality of control loops controlled by the process control system 3200. Each of the plurality of control loops includes a respective field control system (FCS), which is subject to control by the process control system 3200, and an associated group of one or more field devices 2600, which are subject to the controls by the respective field control system (FCS). The loop-device auto-association tool 3400 is configured to automatically load the generated hierarchy tree or the generated one or more loop-device association information to the plant asset value manager 3100. The plant asset value manager 3100 has the user interface with a display screen to display the generated hierarchy tree or the generated one or more loop-device association information, so as to allow an asset meager person to view the loop-device association information. In some cases, the loop-device auto-association tool 3400 is configured to automatically generate one or more loop-device association file 3420 which includes the one or more loop-device association information.

Figure 4:
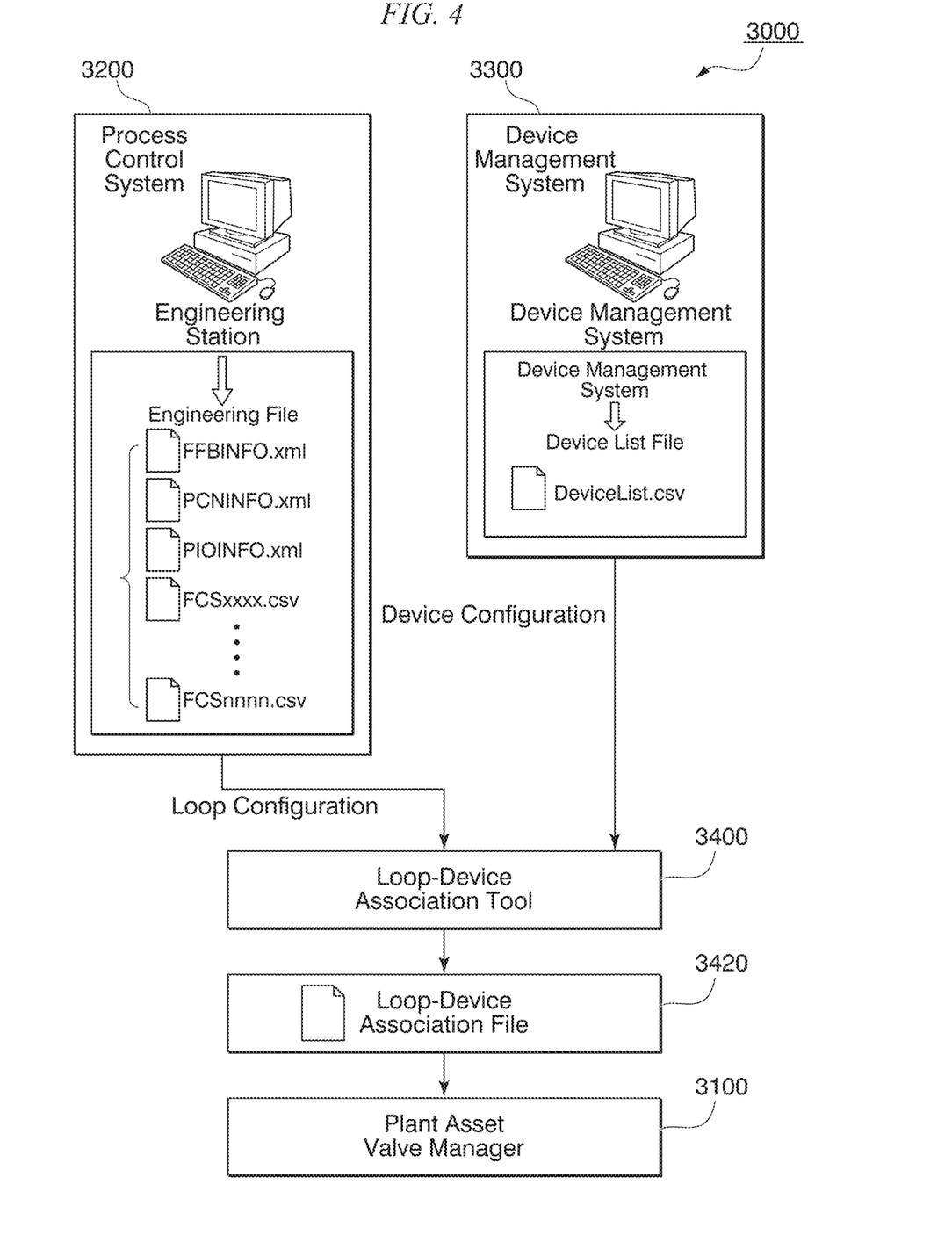
FIG. 4 is a diagram illustrative of an example of the process for generating loop-device association file from the control loop configuration and the device configuration.

FIG. 4 is a diagram illustrative of an example of the process for generating the loop-device association file 3420 from the control loop configuration and the device configuration. The process control system 3200 generates a set of engineering data files which has the device definition. The device management system 3300 generates a device list file. The loop-device auto-association tool 3400 automatically retrieves, from the set of engineering data files in the process control system 3200, engineering data as the device definition that form the basis of the control loop configuration information from the process control system 3200, so that the loop-device auto-association tool 3400 automatically extracts the control loop configuration from the process control system 3200. The loop-device auto-association tool 3400 automatically retrieves, from a device list file in the device management system 3300, data that form the basis of the device configuration information from the device management system 3300, so that the loop-device auto-association tool 3400 automatically extract the device configuration from the device management system 3300. The loop-device auto-association tool 3400 automatically establishes the association between the each control loop and one or more associated field devices from the extracted control loop configurations and the extracted device configurations. The loop-device auto-association tool 3400 automatically generates the loop-device association file 3420 that includes the association between the each control loop and the associated field devices. The loop-device auto-association tool 3400 automatically loads to the plant asset value manager 3100X) the loop-device association file 3420.

Figure 5:
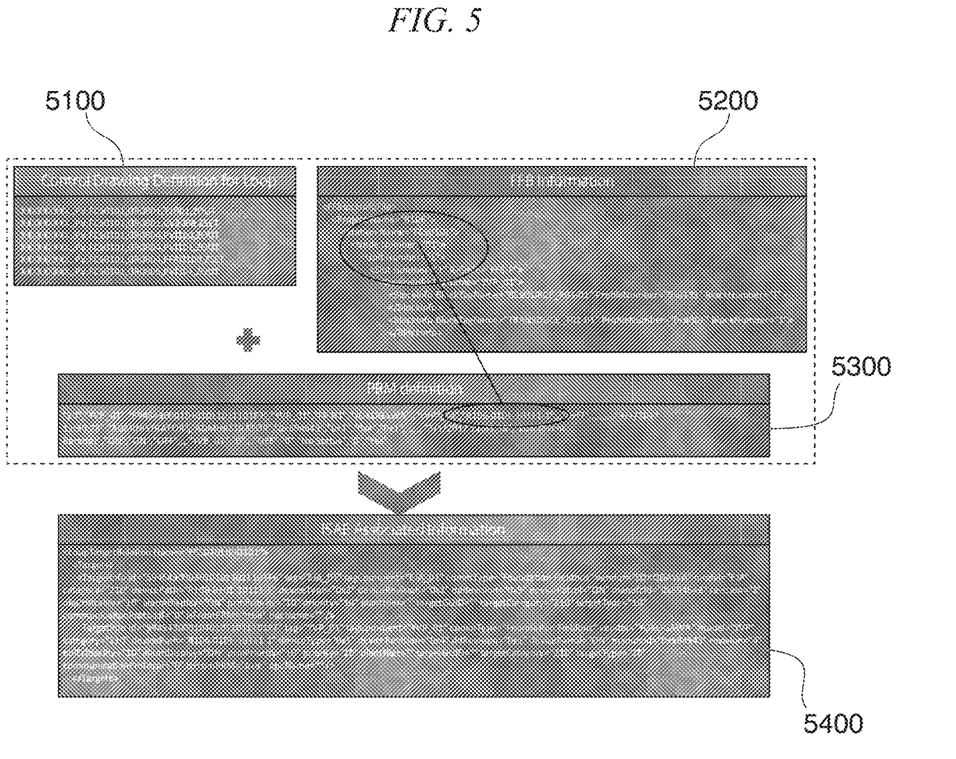
FIG. 5 is a view illustrating the process for automatic association by the loop-device auto-association tool.

FIG. 5 is a view illustrating the process for automatic association by the loop-device auto-association tool 3400. The loop-device auto-association tool 3400 automatically generates the loop-device association information 5400 from the three: 1) the control loop definition 5100 labeled "Control Drawing Definition for Loop"; 2) the flexible function block information 5200 which is configurable, labeled "FFB Information"; and 3) the device definition 5300 of the device management system 3300. The control loop configuration can be extracted from the control loop definition 5100 labeled "Control Drawing Definition for Loop". The device configuration can be extracted from the device definition 5300.

This automatic association process by the loop-device auto-association tool 3400 can be done without manual task to prepare the loop-device association information 5400 for loop diagnostics, resulting in reduction in preparation time substantially. To determine how the loops and their constituent devices are configured, the configuration information is automatically extracted from the definitions of the control system (DCS "PCS") and the device management system. The extracted configuration information is loaded into the plant asset value manager. Based on this configuration information, the plant asset value manager links the relevant loops and devices. The diagnostic results (KPI) of the tags as well as the raw data trends appear on the same time axis, in the combination in which they are linked. This makes it possible to easily determine how the control loops and devices operate with respect to each other at any instant in time. The loop-device auto-association tool 3400 provides automatic retrieval of the control loop configuration information from the process control system 3200. The loop-device auto-association tool 3400 allows display, on the display screen of the plant asset value manager 3100 of the relevant diagnostic results (KPI) values based on the device loop information.

Figure 6:
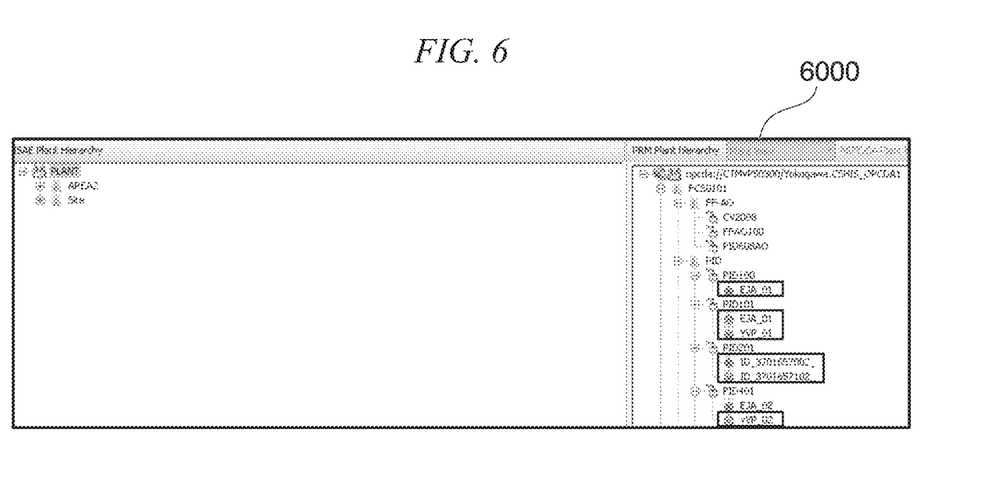
FIG. 6 is a view of two display screen images of the plant asset value manager that show a plant asset value manager plant hierarchy in left and a device manager plant hierarchy in right.

FIG. 6 is a view of two display screen images of the plant asset value manager 3100 that show a plant asset value manager plant hierarchy in left and the result of the association tool in light. The plant asset value manager plant hierarchy in left shows the hierarchy of the plant, to which an area folder "AREA2" and a side folder "Site" belongs. The device manager plant hierarchy in right shows the hierarchy of a field control system (FCS0101). The field control system folder (FCS0101) has two subordinate folders (FF-AO) and (PID). The PID folder has four control loops, which respectively have four controllers (PID100, PID101, PID201 and PID401). The field controller (PID100) has a control valve (EJA_01) which is subject to the control by the field controller (PID100). In the first control loop, the field controller (PID101) has two control valves (EJA_01, YVP_01) which are subject to the control by the field controller (PID100). In the second control loop, the field controller (PID101) has two control valves (EJA_01, YVP_01) which are subject to the control by the field controller (PID101). In the third control loop, the field controller (PID201) has two control valves (ID_3701657002_, ID_3701657102) which are subject to the control by the field controller (PID201). In the fourth control loop, the field controller (PID401) has two control valves (EJA_02, YVP_02) which are subject to the control by the field controller (PID401). The device manager plant hierarchy in right shows the association between the controller and the device subject to the controller.

Figure 7:
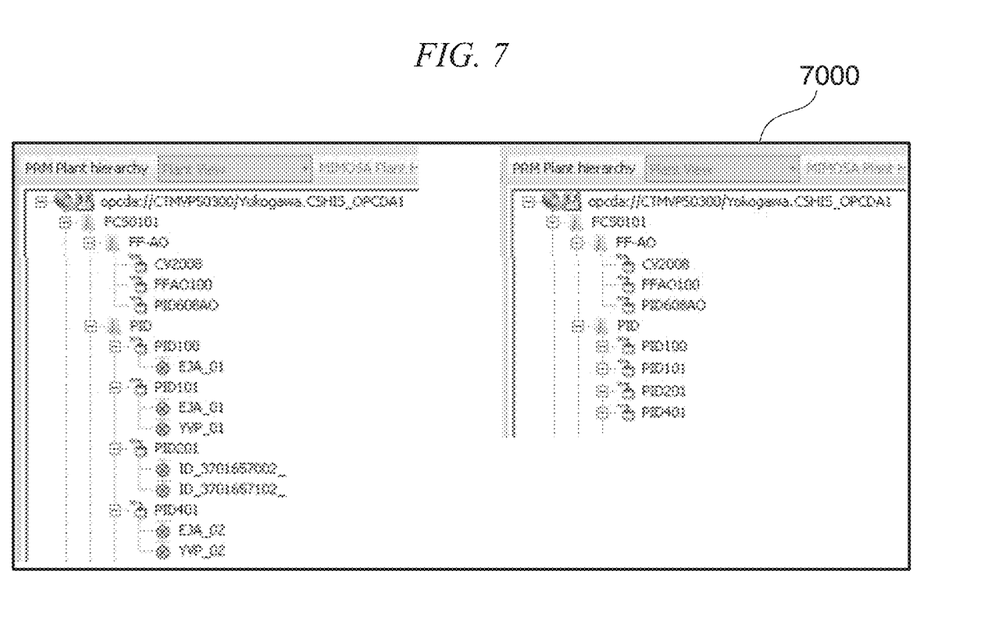
FIG. 7 is a view of two display screen images that show the device manager plant hierarchy with the loops in left with the embodiment and the device manager plant hierarchy without loop in the related art.

FIG. 7 is a view of two display screen images that show the device manager plant hierarchy with the loops in left with the embodiment and the device manager plant hierarchy without loop in the related art. The device manager plant hierarchy in left in FIG. 7 is the same as the device manager plant hierarchy in right in FIG. 6. This device manager plant hierarchy in left in FIG. 7 shows the association between the controller and the device subject to the controller to automatically identify each association between the respective control loop and the associated valves. This device manager plant hierarchy in right in FIG. 7 shows no association between the controller and the device subject to the controller.

This automatic examination process implemented by the loop-device auto-association tool 3400 includes a timeless process for automatically identifying the relationship between the control loops and the connected valves and other field devices.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack. RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer-implemented plant asset management method comprising:
    retrieving, from a set of engineering data files in a process control system, engineering data as a device definition that forms the basis of one or more control loop configurations from the process control system;
    automatically extracting the one or more control loop configurations of control loops from one or more control system definitions of the process control system, each control loop comprising a field control system subject to control by the process control system and one or more field devices subject to control by the field control system;
    retrieving, from a device list file in a device management system, data that forms the basis of device configuration information from the device management system;
    automatically extracting one or more device configurations from one or more device management system definitions of the device management system;
    automatically establishing an association among a control loop, the one or more field devices of the control loop, and at least one of device data and device parameters of the one or more field devices, based on the one or more control loop configurations and the one or more device configurations;
    automatically generating a loop-device association information based on the association;
    automatically generating, from the loop-device association information, a hierarchy tree of an asset management system that includes control loops controlled by the process control system, wherein each control loop includes a respective field control system, which is subject to control by the process control system, and an associated group of one or more field devices, which are subject to control by the respective field control system; and
    displaying, on a display screen, the hierarchy tree of the asset management system.

2. The computer-implemented plant asset management method according to claim 1, wherein the loop-device association information comprises:
    the association between the control loop, which is subject to control by the process control system, and the one or more field devices of the control loop; and
    the at least one of device data and device parameters of the associated group of one or more field devices, the at least one of device data and device parameters being subject to management by the device management system.

3. The computer-implemented plant asset management method according to claim 2, further comprising:
    automatically supplying the loop-device association information to the asset management system; and
    wherein the process control system and the device management system are subject to management by the asset management system.

4. A computer program product for a plant asset management system, the computer program product comprising a computer software embodied on a non-transitory computer readable storage medium, the computer software comprising computer-executable instructions, when executed by one or more computers, to cause the one or more computers to:
    retrieve, from a set of engineering data files in a process control system, engineering data as a device definition that forms the basis of one or more control loop configurations from the process control system;
    automatically extract the one or more control loop configurations of control loops from one or more control system definitions of the process control system, each control loop comprising a field control system subject to control by the process control system and one or more field devices subject to control by a field control system;

retrieve, from a device list file in a device management system, data that forms the basis of device configuration information from the device management system;

automatically extract one or more device configurations from one or more device management system definitions of the device management system;

automatically establish an association among a control loop, the one or more of the field devices of the control loop, and at least one of device data and device parameters of the one or more field devices, based on the one or more control loop configurations and the one or more device configurations;

automatically generate a loop-device association information based on the association;

automatically generate, from the loop-device association information, a hierarchy tree of an asset management system that includes control loops controlled by the process control system, wherein each control loop includes a respective field control system, which is subject to control by the process control system, and an associated group of one or more field devices, which are subject to control by the respective field control system; and display, on a display screen, the hierarchy tree of the asset management system.

5. The computer program product according to claim 4, wherein the loop-device association information comprises:

the association between the control loop, which is subject to control by the process control system, and the one or more field devices of the control loop; and the at least one of device data and device parameters of the associated group of one or more field devices, the at least one of device data and device parameters being subject to management by the device management system.

6. The computer program product according to claim 5, wherein the computer software comprises further computer-executable instructions, when executed by the one or more computers, to cause the one or more computers to:

automatically supply the loop-device association information to the asset management system; and wherein the process control system and the device management system are subject to management by the asset management system.

7. A plant asset management system in a plant, the plant asset management system comprising:

a plurality of field control systems, each of the plurality of field control systems being configured to communicate with a respective group of one or more field devices through a respective field network, and to control the respective group of one or more field devices;

a process control system configured to communicate with the plurality of field control systems through a control network, and to control a plurality of control loops, each of which comprises a respective one of the plurality of field control systems and a respectively connected group of one or more field devices;

a device management system configured to communicate with the plurality of field control systems through the control network, and to manage at least one of device parameters and device data of each of the plurality of field control systems; and a loop-device auto-association system configured to communicate with the process control system and the device management system, the loop-device auto-association system configured to:

retrieve, from a set of engineering data files in the process control system, engineering data as a device definition that forms the basis of one or more control loop configurations from the process control system;

automatically extract the one or more control loop configurations of control loops from one or more control system definitions of the process control system;

retrieve, from a device list file in the device management system, data that forms the basis of device configuration information from the device management system;

automatically extract one or more device configurations from one or more device management system definitions of the device management system;

automatically establish an association among a control loop, the one or more of the field devices of the control loop, and at least one of device data and device parameters of the one or more field devices, based on the one or more control loop configurations and the one or more device configurations;

automatically generate a loop-device association information based on the association; and automatically generate, from the loop-device association information, a hierarchy tree of an asset management system that includes control loops controlled by the process control system, wherein each control loop includes a respective field control system, which is subject to control by the process control system, and an associated group of one or more field devices, which are subject to control by the respective field control system, wherein the hierarchy tree of the asset management system is displayed on a display screen.

8. The plant asset management system according to claim 7, wherein the loop-device association information comprises:

the association between the control loop, which is subject to control by the process control system, and the one or more field devices of the control loop; and the at least one of device data and device parameters of the associated group of one or more field devices, the at least one of device data and device parameters being subject to management by the device management system.

9. The plant asset management system according to claim 8, further comprising:

the asset management system configured to communicate with the loop-device auto-association system, the process control system and the device management system, the asset management system configured to manage the process control system and the device management system, wherein the loop-device auto-association system is further configured to:

automatically supply the loop-device association information to the asset management system.

10. The computer-implemented plant asset management method according to claim 1, wherein the association is displayed in conjunction with operational information related to the association.

11. The computer-implemented plant asset management method according to claim 10, wherein the operational information comprises diagnostic results and raw data trends on a same time axis.

* * * * *